US009350615B2

(12) United States Patent
Lee et al.

(10) Patent No.: US 9,350,615 B2
(45) Date of Patent: May 24, 2016

(54) MANAGEMENT SERVER, MANAGEMENT DEVICE, AND METHOD OF MANAGEMENT OF PLURAL IMAGE FORMING APPARATUSES

(75) Inventors: Ji-young Lee, Seoul (KR); Seung-soo Oak, Seongnam (KR); Byung-oh Park, Suwon (KR); Lye-suk Lee, Suwon (KR); Hyung-chan Kim, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 50 days.

(21) Appl. No.: 13/469,400

(22) Filed: May 11, 2012

(65) Prior Publication Data

US 2012/0303779 A1 Nov. 29, 2012

(30) Foreign Application Priority Data

May 23, 2011 (KR) .................... 10-2011-0048758
Apr. 20, 2012 (KR) .................... 10-2012-0041704

(51) Int. Cl.
*G06F 15/173* (2006.01)
*H04L 12/24* (2006.01)

(52) U.S. Cl.
CPC .......... *H04L 41/0893* (2013.01); *H04L 41/046* (2013.01); *H04L 41/22* (2013.01)

(58) Field of Classification Search
USPC ................ 709/201–203, 217–22; 710/1–5, 8, 710/15–19
See application file for complete search history.

(56) References Cited

U.S. PATENT DOCUMENTS

| 5,651,006 | A | | 7/1997 | Fujino et al. |
| 5,778,183 | A | * | 7/1998 | Filion .................... G06F 3/1294 709/202 |
| 5,796,951 | A | * | 8/1998 | Hamner .............. H04L 41/0233 709/223 |
| 6,769,022 | B1 | * | 7/2004 | DeKoning .......... H04L 12/2602 709/201 |
| 7,111,017 | B1 | * | 9/2006 | Forood .................. H04L 67/303 |
| 7,185,194 | B2 | * | 2/2007 | Morikawa ............. H04L 9/3213 713/156 |
| 7,620,960 | B2 | * | 11/2009 | Nagashima ........... G06F 9/4411 709/220 |

(Continued)

FOREIGN PATENT DOCUMENTS

| EP | 1327938 | 7/2003 |
| EP | 2193464 | 6/2010 |

(Continued)

OTHER PUBLICATIONS

PCT Search Report and Written Opinion issued in PCT/KR2012/003760 dated Nov. 27, 2012.

(Continued)

*Primary Examiner* — Joseph E Avellino
*Assistant Examiner* — Phyllis A Book
(74) *Attorney, Agent, or Firm* — Staas & Halsey LLP

(57) ABSTRACT

Management server is provided. The management server includes a storage unit to store information about a plurality of client groups, a communication interface unit to receive management device identification information from a management device at remote distance connected to at least one image forming apparatus, a mapping unit to map at least one from among the plurality of client groups with the management device based on the received management device identification information, and a control unit to transmit an activation command to the mapped management device, the activation command directing the management device mapped with the client group to collect the information about the connected image forming apparatus.

22 Claims, 11 Drawing Sheets

(56) References Cited

U.S. PATENT DOCUMENTS

| | | | |
|---|---|---|---|
| 7,636,771 B2* | 12/2009 | Torii | H04L 41/0273 709/219 |
| 7,712,095 B2 | 5/2010 | Toyota et al. | |
| 7,747,722 B2* | 6/2010 | Kim | H04L 67/125 709/223 |
| 7,827,261 B1* | 11/2010 | Griswold, Jr. | G06F 15/16 709/223 |
| 7,886,039 B2* | 2/2011 | Popescu | H04L 12/1822 709/205 |
| 8,074,216 B2* | 12/2011 | Tamura | G06F 9/4411 717/174 |
| 8,078,712 B2* | 12/2011 | DeHaan | H04L 41/0803 370/238 |
| 8,150,807 B2 | 4/2012 | Fredlund et al. | |
| 8,291,071 B2 | 10/2012 | Kaneko | |
| 8,305,601 B2* | 11/2012 | Kawai | G06F 3/1204 358/1.15 |
| 8,381,111 B2* | 2/2013 | Kawana | G03G 15/5075 101/494 |
| 8,390,849 B2* | 3/2013 | Imaizumi | H04N 1/00204 358/1.13 |
| 8,392,545 B2* | 3/2013 | Hallamaa | H04L 41/5054 709/223 |
| 8,422,040 B2* | 4/2013 | Noguchi | G06F 3/1204 358/1.13 |
| 8,446,617 B2* | 5/2013 | Nakajima | G06F 21/608 358/1.1 |
| 8,488,161 B2* | 7/2013 | Sunata | G06F 3/1203 358/1.15 |
| 8,526,041 B2* | 9/2013 | Suzuki | G06F 3/1204 358/1.15 |
| 2005/0289229 A1 | 12/2005 | Kim | |
| 2006/0066896 A1* | 3/2006 | Tsuchiya | G06F 11/34 358/1.15 |
| 2007/0055975 A1* | 3/2007 | Tamura | G06F 9/44542 719/322 |
| 2007/0088814 A1 | 4/2007 | Torii | |
| 2007/0156784 A1* | 7/2007 | Yamamoto | H04L 12/24 |
| 2008/0043137 A1* | 2/2008 | Rikima | H04N 1/00204 348/364 |
| 2008/0148265 A1* | 6/2008 | Nakajima | G07C 9/00111 718/102 |
| 2009/0094247 A1 | 4/2009 | Fredlund et al. | |
| 2009/0097061 A1* | 4/2009 | Kaneko | H04N 1/00344 358/1.15 |
| 2010/0088609 A1 | 4/2010 | Kawana | |
| 2010/0107157 A1* | 4/2010 | Seo | G06F 9/4411 717/178 |
| 2010/0177349 A1* | 7/2010 | Tarumi | H04N 1/00204 358/1.15 |
| 2010/0198966 A1 | 8/2010 | Kaneko | |
| 2010/0262467 A1* | 10/2010 | Barnhill, Jr. | H04L 12/2809 709/223 |
| 2011/0208881 A1* | 8/2011 | Abe | G06F 3/1204 710/15 |

FOREIGN PATENT DOCUMENTS

| | | |
|---|---|---|
| JP | 2003-162399 | 6/2003 |
| JP | 2010-200298 | 9/2010 |
| JP | 2010-541098 | 12/2010 |
| KR | 10-2003-0027082 | 4/2003 |

OTHER PUBLICATIONS

Extended European Search Report dated Aug. 6, 2015 in corresponding European Patent Application No. 12168946.7.

Chen et al., "ANMP: Ad Hoc Network Management Protocol", IEEE Journal on Selected Areas in Communications, vol. 17, No. 8, Aug. 1999, pp. 1506-1531.

Examination Report dated Mar. 17, 2016 issued in European Patent Application No. 12168946.7.

* cited by examiner

FIG. 7

| DESIGNATE GROUPS | | | | | | | |
|---|---|---|---|---|---|---|---|
| ☐ | CURRENT STATUS <◄ | GROUP<◄ | VERSION<◄ | IP ◇ | START DATE ▲ | POLLING TIME | RESERVED POLLING TIME | JOB |
| ☐ | STOP | UI Team | 2.5.8.03 | 10.88.181.106 | 2011-04-07 20:27:49 | 10 | | ACTIVATED |

CORRECT   DELETE

| NON-DESIGNATED | | | | | | |
|---|---|---|---|---|---|---|
| ☐ | S/N | ALIAS | IP | VERSION | DATE | TYPE |
| ☐ | fde48442144626273db39247898e 16ae2678a4282e8e0308b | Solution LAB | 10.88.182.69 | 2.5.9.06 | 2011-04-07 20:26:47.247 | PC |
| ☐ | f8a07fac3e18b57471022212831ae57678a4282e8e0308b | Samsung | 10.88.195.201 | 2.5.9.06 | 2011-04-07 20:26:21.42 | PC |

DELETE

FIG. 8

| ENTIRE MONITORING | DESIGNATE GROUPS | | | | | | | |
|---|---|---|---|---|---|---|---|---|
| ⊟–All | ☐ | CURRENT<▲ STATUS | GROUP<▲ | VERSION<▲ | IP | START DATE ▲ | POLLING TIME | RESERVED POLLING TIME | JOB |
| ⊞–☐△Group 1 | ☐ | STOP | UI Team | 2,5,8,03 | 10,88,181,106 | 2011-04-07 20:27:49 | 10 | | ACTIVATED |
| └–☐⊗Samsung | | | | | | | | | |
| | | | | | ≪ 1 ≫ | | | CORRECT  DELETE |
| | NON-DESIGNATED | | | | | | | |
| | ☐ | S/N | | ALIAS | IP | VERSION | DATE | TYPE |
| | ☐ | fde48442144262 73db392477898e 16ae2678a4282a 8e0308b | | Solution LAB | 10,88,182,69 | 2,5,9.06 | 2011-04-07 20:26:47,247 | PC |
| | ☐ | f8a07fac3e18bb5 7471022212831 ae57678a4282e8 e0308b | | Samsung | 10,88,195,201 | 2,5,9.06 | 2011-04-07 20:26:21,42 | PC |
| | | | | ≪ 1 ≫ | | | | |

800

1. Click

NON-DESIGNATED
⊟–All
 ⊞–△Group 1
 ⊞–⊗Samsung
  ├–⊗IT Solution
  └–⊗System SW
  } 2. Select Client Group

ENTER    CLOSE

| ENTIRE MONITORING | | | | | | | |
|---|---|---|---|---|---|---|---|
| ⊟ All | | | | | | | |
| ⊞ □△ Group 1 | | | | | | | |
| ⊞ □⊗ Samsung | | | | | | | |

DESIGNATE GROUPS — 900

| □ | CURRENT STATUS <▲ | GROUP<▲ | VERSION<▲ | IP < | START DATE ▲ | POLLING TIME | RESERVED POLLING TIME | JOB |
|---|---|---|---|---|---|---|---|---|
| ☑ | STOP | UI Team | 2,5,8,03 | 10,88,181,106 | 2011-04-07 20:27:49 | 10 | | ACTIVATED ⇅ |

1. Select an agent   ≪ 1 ≫ — 950

CORRECT  DELETE — 901
2. Click

NON-DESIGNATED — 910

| □ | S/N | ALIAS | IP | VERSION | DATE | TYPE |
|---|---|---|---|---|---|---|
| □ | fde48442144262673db39247898e16ae26678a4282e8e0308b | Solution LAB | 10,88,182,69 | 2,5,9,06 | 2011-04-07 20:26:47,247 | PC |
| □ | f8a07fac3e18bb57471022212831ae57678a4282e8e0308b | Samsung | 10,88,195,201 | 2,5,9,06 | 2011-04-07 20:26:21,42 | PC |

≪ 1 ≫

DELETE — 960

MANAGEMENT SERVER, MANAGEMENT DEVICE, AND METHOD OF MANAGEMENT OF PLURAL IMAGE FORMING APPARATUSES

CROSS-REFERENCE TO RELATED APPLICATIONS

This application claims priority under 35 U.S.C. §119 (a) from Korean Patent Application No. 10-2011-0048758, filed on May 23, 2011, in the Korean Intellectual Property Office, and Korean Patent Application No. 10-2012-0041704, filed on Apr. 20, 2012, in the Korean Intellectual Property Office, the disclosure of which is incorporated herein by reference in its entirety.

BACKGROUND OF THE INVENTION

1. Field of the Invention

The present general inventive concept relates to a management server, a management device and a method of management for a plurality of image forming apparatuses, and, more particularly, to a management server to map a management device, which to manage a plurality of image forming apparatuses at remote distances, and to a client group under management of the management device. The present general inventive concept is also directed to a management device and a method of managing a plurality of image forming apparatuses.

2. Description of the Related Art

An image forming apparatus generally operates to print the print data generated at a terminal device such as a computer onto a recording paper. The image forming apparatus may include, for example, a copier, a printer, a facsimile, or a multi function peripheral (MFP) which integrates the functions of the above-mentioned apparatuses therein.

The business-to-business (i.e., "B2B") market has recently been developed in which printer management solution suppliers manage the printers at universities, companies, or the like. In such a B2B market, the printer management solution supplier manages a job log of the image forming apparatus (such as a printer) within a network, and computes the workload to charge individual or groups of individuals based on the amount of use.

Since the printers at universities or companies are at remote distances from the management server of the printer management solution supplier, and also considering the fact that the public offices, universities or companies generally use firewall or internal networks, it is necessary for the management server to collect information of the plurality of image forming apparatuses using the management device (or agent) located at a remote distance.

Meanwhile, in order for the management device to collect the information of the plurality of image forming apparatuses, the management device has to be mapped with one of the client group under management of the management server. Conventionally, the management device and the client group are mapped with each other by a method illustrated in FIG. 12.

FIG. 12 is a view provided to explain a conventional method of mapping the management device with the client group.

Referring to FIG. 12, at operation 1, a manager generates an agent key file corresponding to a client group to be mapped to the management device. At operation 2, the manager sends the generated agent key file to a person in charge of installation of the management device or moves to a remote distance at which the management device is located, so that at operation 3, the person in charge of installation (or the manager) implements the agent key file to the management device. At operation 4, the management device acquires an ID of the client group to be mapped based on the implemented agent key file and completes the mapping by sending the acquired ID and information of the client group to the management server.

However, to map the client group with the management device in the conventional manner explained above, the manager has to do a rather cumbersome process of moving to the remote distance and installing the agent key file. It is also inconvenient since the manager has to do the above-mentioned process with respect to every management device that has changes as the connection between the management device and the management server changes.

Further, since the mapping takes some time (i.e., standby time), it is impossible to manage the image forming apparatus connected to the corresponding management device during the standby time.

SUMMARY OF THE INVENTION

The present general inventive concept provides a management to map a management device, which efficiently manages a plurality of image forming apparatuses at remote distances, to a client group under management of the management device. The present general inventive concept also provides a management device and a method of managing a plurality of image forming apparatuses.

Additional features and utilities of the present general inventive concept will be set forth in part in the description which follows and, in part, will be obvious from the description, or may be learned by practice of the general inventive concept.

Exemplary embodiments of the present general inventive concept may provide a management server that includes a storage unit to store information about a plurality of client groups, a communication interface unit to receive management device identification information from a management device at a remote distance connected to at least one image forming apparatus, a mapping unit to map at least one client group from among the plurality of client groups with the management device based on the received management device identification information, and a control unit to transmit an activation command to the mapped management device, the activation command directing the management device mapped with the client group to collect the information about the connected at least one image forming apparatus.

The management device identification information may include at least one of a name, an internet protocol (IP) address, and a unique serial number of the management device.

The management server may include a display unit to display non-mapped management devices which are not mapped with the plurality of client groups, and an input unit to select at least one non-mapped management device from among the non-mapped management devices and select a client group from among the plurality of client groups which is to be mapped with the selected management device, where the mapping unit maps the selected management device with the selected client group.

The management server may include a management unit to request the management device in receipt of the activation command for the information about the at least one image forming apparatus connected to the management device in receipt of the activation command and receive the requested information.

The information about the at least one image forming apparatus may include at least one of unique information, status information, and job information of the image forming apparatus.

The job information may include at least one of the number of copies to be printed, a job log, and an operating ratio of the at least one imaging forming apparatus.

The storage unit can store the received information about the image forming apparatus under each corresponding client group.

Exemplary embodiments of the present general inventive concept may also provide a management device connectable to a plurality of image forming apparatuses and a management server at remote distance, which may include a user interface unit to receive an agent initiation command to request information about the plurality of image forming apparatuses to the management server, a communication interface unit to transmit management device identification information to the management server, when the agent initiation command is received, and a control unit to control the communication interface unit to transmit the information about the connected image forming apparatuses to the management server, when the activation command is received from the management server.

The user interface unit receives an input of a name of the management device, and the management device identification information includes the inputted name of the management device.

The management device identification information may include at least one of a name, an IP address, and a unique serial number of the management device.

The management device may be at least one of the image forming apparatuses, and a print control terminal apparatus connectable to the image forming apparatuses.

Exemplary embodiments of the present general inventive concept may be achieved by providing a method of managing a management server for a plurality of image forming apparatuses, which may include receiving management device identification information from a management device at remote distance connected to at least one of the plurality of image forming apparatuses, mapping at least one client group from among a plurality of client groups with the management device based on the received management device identification information, and transmitting an activation command to the mapped management device, the activation command directing the management device mapped with the client group to collect the information about the connected at least one image forming apparatus.

The management device identification information may include at least one of a name, an IP address, and a unique serial number of the management device.

The method may include displaying non-mapped management devices which are not mapped with the plurality of client groups, and selecting at least one non-mapped management device from among the non-mapped management devices, and selecting a client group from among the plurality of client groups which is to be mapped with the selected management device, where the mapping comprises mapping the selected management device with the selected client group.

The method may include that when the activation command has been received, requesting the management device for the information about the at least one image forming apparatus connected to the management device in receipt of the activation command and receiving the requested information.

The information about the image forming apparatus may include at least one of unique information, status information, and job information of the image forming apparatus.

The job information includes at least one of the number of copies to be printed, a job log, and an operating ratio of the image forming apparatus.

The method may include storing the received information about the at least one image forming apparatus under each corresponding client group.

Exemplary embodiments of the present general inventive concept may be achieved by providing a method of managing a management device for a plurality of image forming apparatuses, which may include inputting an agent initiation command directing to provide information about the plurality of image forming apparatuses to a management server, transmitting management device identification information to the management server, if the agent initiation command is inputted, receiving an activation command from the management server, and transmitting the information about at least one connected image forming apparatus connected to the management device of the plurality of image forming apparatuses to the management server.

The method may include inputting a name of the management device, wherein the management device identification information includes the inputted name of the management device.

The management device identification information may include at least one of a name, an IP address and a unique serial number of the management device.

The management device may be at least one of the image forming apparatus, and a print control terminal apparatus connectable to the image forming apparatus.

Exemplary embodiments of the present general inventive concept may also provide a method of managing a management server for a plurality of image forming apparatuses, the method including receiving management device identification information from a management device at remote distance connected to at least one image forming apparatus, mapping at least one from among a plurality of client groups with the management device based on the received management device identification information, and transmitting an activation command to the mapped management device, the activation command directing the management device mapped with the client group to collect the information about the connected image forming apparatus.

The management device identification information may include at least one of a name, an IP address, and a unique serial number of the management device.

The method may include displaying non-mapped management devices which are not mapped with the plurality of client groups, and selecting at least one from among the non-mapped management devices, and selecting a client group from among the plurality of client groups which is to be mapped with the selected management device, where the mapping includes mapping the selected management device with the selected client group.

The method may include requesting the management device in receipt of the activation command for the information about the image forming apparatus connected to the management device in receipt of the activation command and receiving the requested information.

The information about the image forming apparatus may include at least one of unique information, status information, and job information of the image forming apparatus.

The job information may include at least one of the number of copies to be printed, a job log, and an operating ratio of the image forming apparatus.

The method may include storing the received information about the image forming apparatus under each corresponding client group.

Exemplary embodiments of the present general inventive concept may be achieved by providing a method of managing a management device for a plurality of image forming apparatuses, the method including inputting an agent initiation command directing to provide information about the plurality of image forming apparatuses to the management server, transmitting management device identification information to the management server, if the agent initiation command is inputted; receiving the activation command from the management server, and transmitting the information about connected image forming apparatus to the management server.

The method may include inputting a name of the management device, where the management device identification information includes the inputted name of the management device.

The management device identification information may include at least one of a name, IP address, and a unique serial number of the management device.

The management device may be at least one of the image forming apparatus, and a print control terminal apparatus connectable to the image forming apparatus.

Exemplary embodiments of the present general inventive concept may also provide a management information system, including a management device communicatively coupled to at least one image forming apparatus, and a management server to receive management device identification information from the management device, to map at least one client group from among a plurality of client groups with the management device according to the received management device identification information, and to transmit an activation command to the mapped management device to collect the information about the connected at least one image forming apparatus.

Exemplary embodiments of the present general inventive concept may also provide a method of managing a management information system including a management device for a plurality of image forming apparatuses communicatively coupled thereto and a management server, the method including receiving an agent initiation command with the management device to provide information about the plurality of image forming apparatuses to the management server, when the agent initiation command is received by the management device, transmitting management device identification information from the management device to the management server, receiving an activation command from the management server with the management device, and transmitting the information about at least one image forming apparatus of the plurality of image forming apparatuses from the management device to the management server.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 7 to 9 are views illustrating an example of a user interface (UI) window to be displayed on a display unit of FIG. 2 according to exemplary embodiments of the present general inventive concept;

DETAILED DESCRIPTION OF THE PREFERRED EMBODIMENTS

Figure 1:
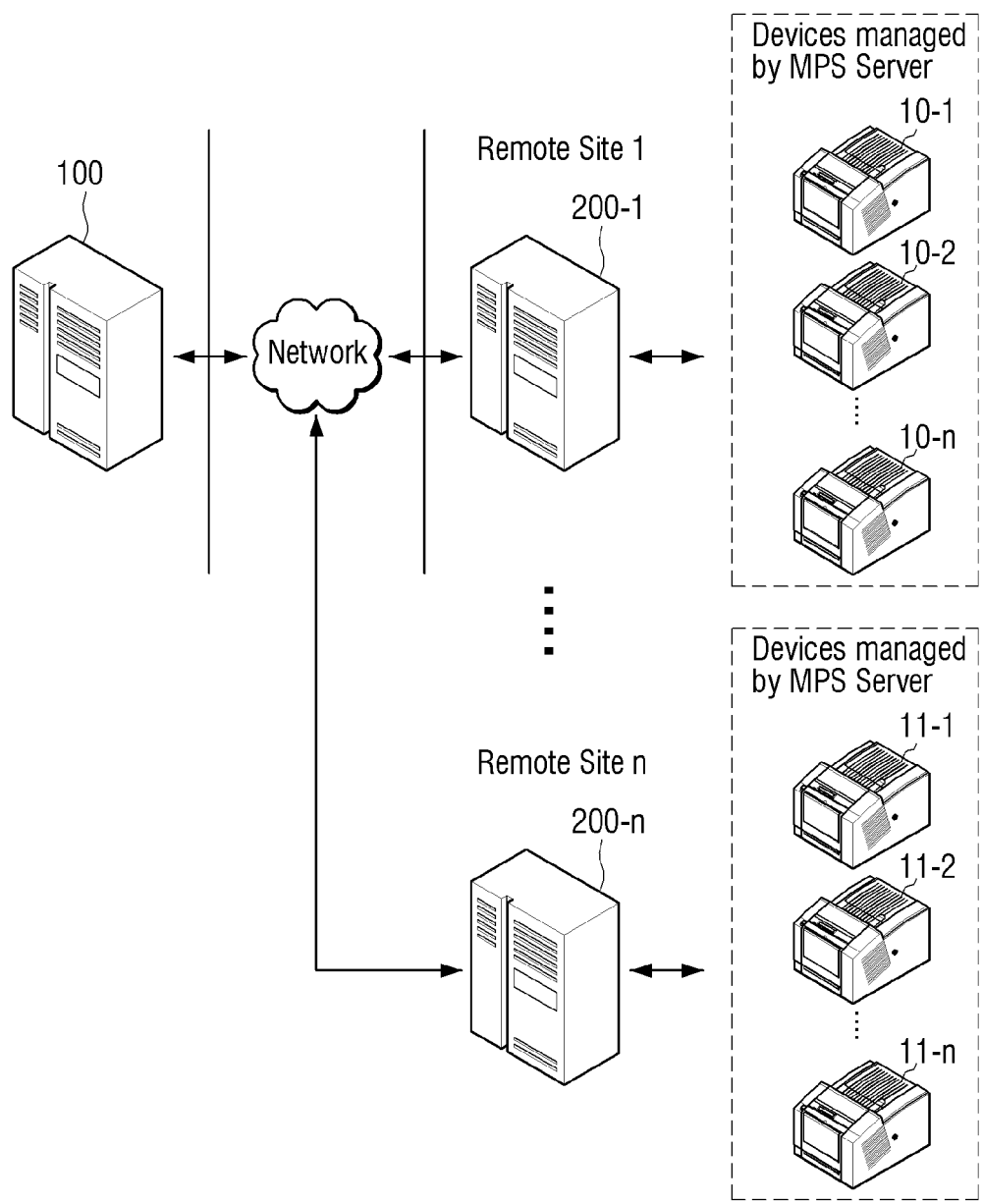
FIG. 1 is a block diagram illustrating an MPS management system according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an Management Presence Server (MPS) management system according to exemplary embodiments of the present general inventive concept.

Referring to FIG. 1, the MPS management system 1000 may include a management server 100 and a plurality of management devices (200-1, . . . , 200-n). The management server 1000 may be a computer or any suitable server to manage the management devices 200 and the image forming apparatuses coupled thereto so as to carry out the exemplary embodiments of the present general inventive concept as disclosed herein. The management server 100 may be communicatively coupled to the plurality of management devices (200-1, . . . , 200-n) via a wired and/or wireless communication link. In exemplary embodiments of the present general inventive concept, the management server 100 may be communicatively coupled to the management devices (200-1, . . . , 200-n) via a network.

The management server 100 receives from the plurality of management devices (200-1, . . . , 200-n) information of image forming apparatuses (10-1, 10-2, . . . , 10-n, 11-1, 11-2, . . . , 11-n) communicatively coupled via a wired and/or wireless communications link to each of the plurality of management devices (200-1, . . . , 200-n), and manages the respective image forming apparatuses based on the received information. The information received from the image forming apparatuses may include, for example, the make, mode, serial number, operating status (e.g., operational, non-operational, etc.), type of image forming apparatus (e.g., black-and-white printer, color printer, copier, scanner, fax machine, etc.), and/or any other suitable operational characteristics of the image forming apparatus. That is, the management server 100 may control the operation of one or more of the image forming apparatuses according to the received information to perform image forming tasks and/or jobs. The detailed construction and operation of the management server 100 will be explained below with reference to FIG. 2.

The plurality of management devices (200-1, ..., 200-n) can be communicatively connected to the management server 100, and each can be communicatively connected to at least one image forming apparatus (10-1, 10-2, ..., 10-n, 11-1, 11-2, ..., 11-n). The plurality of management devices (200-1, ..., 200-n) can collect the information of the connected image forming apparatus in response to a request of the management server 100 and can transmit the collected image of the image forming apparatus to the management server 100. The management device 200 will be explained below with reference to FIG. 3. The management device 200 may be a print control terminal such as personal computer (PC) or a laptop, or an image forming apparatus such as a printer, a copier, or an MFU (i.e., a multi-function unit).

As illustrated in FIG. 1, two management devices (200-1, 200-n) can be communicatively connected to the management server 100 via a wireless and/or wired communications link. However, depending on implementations, three or more management devices may be communicatively connected to the management server 100. Further, although FIG. 1 illustrates that the management device 200 is communicatively connected to each of the three or more image forming apparatuses (10-1, 10-2, ..., 10-n), this is merely an example, and a different number of image forming apparatuses may be communicatively connected to each of the management devices 200, and at least one image forming apparatus may be communicatively connected to the management device 200.

Figure 2:
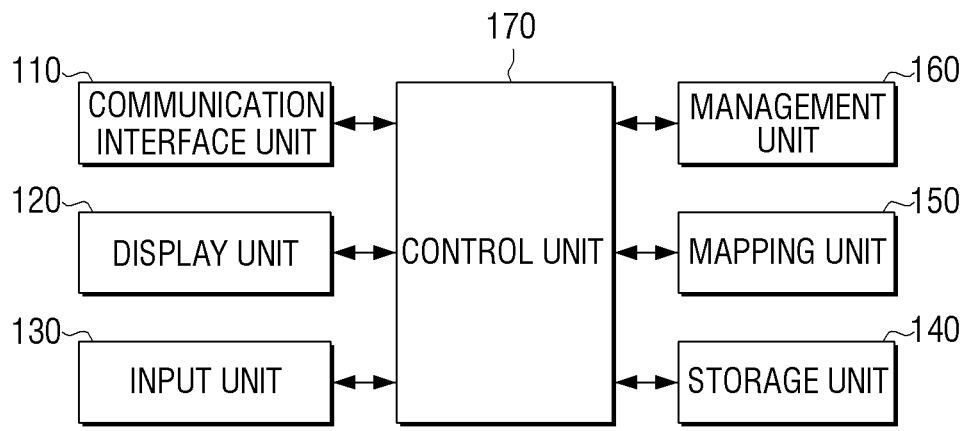
FIG. 2 is a detailed block diagram illustrating the management server of FIG. 1.

FIG. 2 illustrates a detailed block diagram of the management server of FIG. 1 according to exemplary embodiments of the present general inventive concept.

Referring to FIG. 2, the management server 100 may include a communication interface unit 110, a display unit 120, an input unit 130, a storage unit 140, a mapping unit 150, a management unit 160, and a control unit 170.

The communication interface unit 110 may be connected to a plurality of management devices (200-1, ..., 200-n). The communication interface unit 110 may communicatively connect the management server 100 to an external device, and may be communicatively connected to the plurality of management devices (200-1, ..., 200-n) via local area network (LAN) or Internet.

The communication interface unit 110 can receive identification information from the management device 200 to identify the management device. The communication interface unit 110 may receive from the management device 200 information including name (or alias), IP address, or unique serial number (e.g., media access control (MAC) data) that can identify the corresponding management device 200.

The communication interface unit 110 can transmit an activation command to the management device 200. The communication interface unit 110 may transmit an activation command to the management device 200 that is newly mapped by the mapping unit 150, which will be explained below, thereby collecting the information of the image forming apparatuses (10-1, 10-2, ..., 10-n) connected to the corresponding management device 200.

The communication interface unit 110 can receive information of the image forming apparatuses from the respective management devices (200-1, ..., 200-n). The communication interface unit 110 may request the respective management devices (200-1, ..., 200-n) to transmit the information of the image forming apparatuses (10-1, 10-2, ..., 10-n, 11-1, 11-2, ..., 11-n) communicatively connected to the respective management devices (200-1, ..., 200-n), and receive the information of the image forming apparatuses connected to the corresponding management devices from the respective management devices (200-1, ..., 200-n) as a response. The received information of the image forming apparatus may include, for example, unique information (e.g., model name, IP address, driver information, location information, etc.) of the image forming apparatus, status information (e.g., on/off, generation of error), recording medium information (e.g., type, amount, etc., of recording medium) of the image forming apparatus, or job information (e.g., the number of copies to be printed, job log, operating ratio of the image forming apparatus).

The communication interface unit 110 may receive a request for information from the respective management devices (200-1, ..., 200-n), and transmit the requested information to the corresponding management device. The manager (or user) may request the management server 100 via the management device or image forming apparatus for information such as job log of the image forming apparatus. In response, the management server 200 may transmit the corresponding information to the corresponding management device 200.

The display unit 120 may display various information supported by the management server 100. The display unit 120 may be a monitor, a television, an/or any suitable display device. The display unit 120 may display information about a plurality of client groups under management of the management server 100. Client groups may be one or more devices and/or groups of devices, such as the image forming apparatuses (10-1, 10-2, ..., 10-n, 11-1, 11-2, ..., 11-n) illustrated in FIG. 1, to be collectively managed by the management server 100. The display unit 120 may display a plurality of client groups (or management groups, hereinafter referred to as the client groups) under management of the management server 100. The display unit 120 may concurrently display the management devices mapped with the corresponding client group. Herein, the display unit 120 may distinguish between the client groups without mapping with the management device (i.e., client groups that have not been mapped to at least one management device) from the client groups with mapping with the management device (i.e., client groups that have been mapped to at least one management device), in displaying the client groups. That is, one or more of the image forming apparatuses (10-1, 10-2, ..., 10-n, 11-1, 11-2, ..., 11-n) illustrated in FIG. 1 may be grouped together to form a client group, and the mapping unit 150 of the management server 100 may associate the client group with a management device so as to map the client group with the management device. One or more user interface windows may be displayed on the display unit 120 that is coupled to the management server 100, as explained in detail below with reference to FIGS. 7 to 9.

The input unit 130 of the management server 100 may include a plurality of function keys with which the manager may set or select one or more functions supported by the management server 100. The input unit 130 may include at least one of a keyboard, a mouse, a touchscreen, an/or any other suitable input device to select one or more functions provided by the management server 100 according to exemplary embodiments of the present general inventive concept as disclosed herein. The input unit 130 may select at least one management device from among the non-mapped management devices (e.g., management devices 200-1 ... 200-n), and select a client group (e.g., where the client group includes at least one of image forming apparatuses 10-1, 10-2, ..., 10-n, and/or 11-1, 11-2, ..., 11-n) to be mapped with the selected management device. The input unit 130 may also receive a command directing to change or delete a communicative connection between the mapped management device and the client group. In exemplary embodiments of the present general inventive concept, the display unit 120 and the input unit 130 can be separate devices. However, this is merely an example, and the display unit 120 and the input unit 130 may be integrated so as to form a touchpad which is capable of handling both input and output.

The storage unit 140 may store information about the plurality of client groups. The storage unit 140 may be a hard disk drive, a solid state drive (SSD), a memory device, and/or any suitable storage device to carry out the exemplary embodiments of the present general inventive concept disclosed herein. The storage unit 140 may store information about a plurality of client groups which may be managed by (e.g., controlled by) the management server 100. Herein, the information about the client group may include name of the client group, management device mapped with the client group, or the like.

The storage unit 140 may store identification information by which the management device is identified. The storage unit 140 may store the management device identification information received via the communication interface unit 110. The management device identification information may be inputted and/or receive through the input unit 130. The inputted management device identification information may be stored at the storage unit 140.

The storage unit 140 may store the information of the image forming apparatuses. The storage unit 140 may store the information (for example, the unique information, the status information, and the job information) about the image forming apparatuses (e.g., image forming apparatuses 10-1, 10-2, . . . , 10-n, and/or 11-1, 11-2, . . . , 11-n) received from the management devices 200 under corresponding client groups which correspond to the management devices that send out the corresponding information.

The storage unit 140 may be a storage medium that is within the management server 100, and/or as an external storage medium, such as a removable disk including USB memory, or database connected to a management server (host).

The mapping unit 150 of the management server 100 can map the management device with the client group. The mapping unit 150 may map (i.e., associate) a plurality of client groups with a plurality of management devices. Herein, the mapping unit 150 may map one management device to one client group, or may map a plurality of management devices to one client group.

The mapping may be carried out automatically or manually as selected by the manager. With the automatic mapping, the mapping unit 150 of the management server 100 can compare the management device identification information received from the management device with the management device identification information previously stored through the input unit 130 of the management server 100 and/or information about the client group. The mapping unit 150 can select a client group to which the corresponding management device is to be mapped, and can map the selected client group to the management device. By way of example, if the name of the management device within the management device identification information received from the management device is "Company 1 Agent" and the client group includes "Company 1", the mapping unit 150 may map the corresponding management device with the client group of "Company 1".

With mapping manually carried out in response to a selection by the manager, if the management device identification information is received from the management device 200, the mapping unit 150 of the management server 100 can control the display unit 120 to display the presence of the non-mapped management device. The mapping unit 150 can receive through the input unit 130 the input about the client group to which the corresponding management device is to be mapped, and can accordingly map the corresponding management device to the selected client group. In exemplary embodiments of the present general inventive concept, the manager can map the management device to the client group using the display unit 120 and the input unit 130 of the management server 100. However, this is merely an example, and the mapping of the management device to the client group is not limited thereto. For example, if the management server 100 includes a web server to manage a plurality of image forming apparatuses, the manager may access the corresponding web server (e.g., the manager may access the web server of the management server 100 from a remote distance) to map the management device to the client group.

The management unit 160 of the management server 100 can manage the plurality of image forming apparatuses. In response to a request or without a request by the manager, the management unit 160 may request a plurality of management devices 200 connected thereto for the information of the image forming apparatuses connected to the corresponding management devices, and store the information of the image forming apparatuses received as a response to the storage unit 140. The management unit 160 may also carry out management operations of a general MPS system (e.g., MPS management system 1000, illustrated in FIG. 1) based on the received information of the image forming apparatuses such as, for example, print history, charged cost, lifespan, etc.

The control unit 170 of the management server 100 may control the respective components of the management server 100 (e.g., the communication interface unit 110, the display unit 120, the input unit 130, the storage unit 140, the mapping unit 150, and the management unit 160). The control unit 170 may be a processor, a field programmable gate array, a programmable logic circuit, an integrated circuit, and/or any suitable controller to carry out the exemplary embodiments of the present general inventive concept disclose herein. When receiving management device identification information from the management device 200, the control unit 170 may control the mapping unit 150 to map the management device that sends out the identification information with one of the plurality of client groups. The control unit 170 may also control the communication interface unit 110 to transmit an activation command to a corresponding management device so that the corresponding management device operates as an agent.

As explained above, according to exemplary embodiments of the present general inventive concept, the management server 100 can map the management devices 200 with the client groups, without having to separately generate an agent key file and install the generated agent key file in the management devices 200 at remote distances. The management server 100 may change a mapping relationship between the management devices and the client groups using a control operation at the management server 100.

Figure 3:
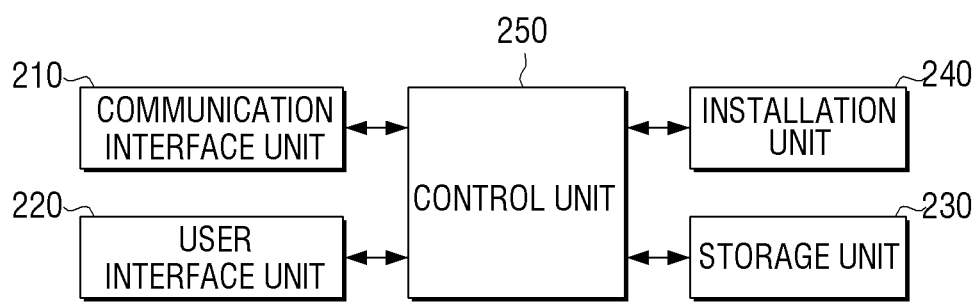
FIG. 3 is a detailed block diagram illustrating the management device of FIG. 1.

FIG. 3 illustrates a detailed block diagram of the management device 200 of FIG. 1 according to exemplary embodiments of the present general inventive concept.

Referring to FIG. 3, the management device 200 may include a communication interface unit 210, a user interface unit 220, a storage unit 230, an installation unit 240, and a control unit 250.

The communication interface unit 210 can communicatively connect the management device 200 to the management server 100, and may access the management server 100, for example, via a local area network (LAN) and the Internet. The communication interface unit 210 may connect to at least one image forming apparatus 10, and may access the image forming apparatus 10 via, for example, a local area network (LAN), the Internet, and a Universal Serial Bus (USB) or the like.

The communication interface unit 210 can transmit management device information to the management server 100. The communication interface unit 210 may transmit to the management server 100 the information such as name (or alias), IP address, or unique serial number (e.g., MAC information) of the management device to thus identify the management device.

The communication interface unit 210 can receive an activation command. In response to the management device identification information that the communication interface unit 210 sent, the communication interface unit 210 may receive from the management server 100 an activation command (i.e., a command to activate an agent function) directing to collect the information of the connected image forming apparatuses (10-1, 10-2, ..., 10-n).

The communication interface unit 210 can receive the information of the image forming apparatuses from the image forming apparatuses (10-1, 10-2, ..., 10-n) communicatively connected thereto. The communication interface unit 210 may send out to the management server 100 the information about the image forming apparatuses (10-1, 10-2, ..., 10-n) communicatively connected thereto. Upon request from the management server 100 or, alternatively, without a request, the communication interface unit 210 may transmit the unique information (e.g., IP address, driver information, location information), status information (e.g., on/off, generation of error such as a 'paper jam' or 'no paper' error), recording medium information (e.g., type of recording medium, amount of recording medium, etc.), job information (e.g., the number of copies to be printed, job log, operating ratio) of the image forming apparatuses connected thereto.

The communication interface unit 210 may request the management server 100 for specific information, and receive corresponding information as a response. By way of example, if the user requests log information about a specific image forming apparatus, the communication interface unit 210 may request the management server 100 for the log information about the specific image forming apparatus and receives the corresponding information from the management server 100.

The user interface unit 220 may include a plurality of function keys with which the manager can set or select various functions supported by the management device 200. The user interface unit 220 may also display various information provided by the management device 200. The user interface unit 220 may be a device like a touchpad which integrates both input and output, or an input device such as a mouse or a keyboard with a display device such as a CRT (cathode ray tube) monitor, a LCD (liquid crystal display) monitor, or LED (light emitting diode) display. The manager may input an agent initiation command through the user interface window provided by the user interface unit 220 to thereby direct the management device 200 to initiate the agent function.

The manager may input through the user interface window provided by the user interface unit 220 the name of the management device 200 (e.g., alias). The inputted name of the management device 200 may be stored in the storage unit 230.

The storage unit 230 can store the management device identification information. The storage unit 230 may be a hard disk drive, a solid state drive (SSD), a memory device, and/or any suitable storage device to carry out the exemplary embodiments of the present general inventive concept disclosed herein. The storage unit 230 may store the information including, for example, name, IP address, unique serial number (e.g., MAG information), etc. of the management device which is inputted through the user interface unit 220.

The storage unit 230 may store information about the image forming apparatuses (10-1, 10-2, ..., 10-n) connected to the management device 200. The storage unit 230 may store the unique information (e.g., model name, IP address, driver information, location information), status information (e.g., on/off, generation of error such as a 'paper jam' or 'no paper' error, recording medium information (e.g., type of recording medium, amount of recording medium, etc.), job information (e.g., the number of copies to be printed, job log, operating ratio) of the image forming apparatuses. If the plurality of image forming apparatuses are mapped to the management device 200, the storage unit 230 may store the information of each image forming apparatus separately.

The storage unit 230 may be a storage medium within the management server 100 and/or an external storage medium, such as a removable disk including USB memory, a storage medium connected to the management device, or a web server accessible via the network.

The installation unit 240 can install a program so that the management device 200 can operate as an agent. If the program is not installed on the management device 200, the installation unit 240 may install the agent program on the management device 200 in response to an agent initiation command issued by the manager. The agent initiation command of the manager may be a command directing to install the agent program. In exemplary embodiments of the present general inventive concept, the agent program may be installed on the management device 200. However, the present general inventive concept is not limited thereto, and a control module (or control device) implementing the agent program may be installed in the management device 200.

The control unit 250 may control the respective components of the management device 200 (e.g., the communication interface unit 210, the user interface unit 220, the storage unit 230, and the installation unit 240). The control unit 250 may be a processor, a field programmable gate array, a programmable logic circuit, an integrated circuit, and/or any suitable controller to carry out the exemplary embodiments of the present general inventive concept disclose herein. If the control unit 205 receives an agent initiation command from the manager through the user interface unit 220, the control unit 250 may control the installation unit 240 to install the agent program on the management device 200. When the agent program is installed on the management device 200, the control unit 250 may control the communication interface unit 210 so that the management device identification information is transmitted to the management server 100, and if an activation command is received from the management server 100, control the communication interface unit 210 so that the information about the connected image forming apparatuses is transmitted to the management server 100.

As explained above, the management device 200 according to exemplary embodiments of the present general inventive concept can map the management devices with the client groups by transmitting the identification information to the management server 100 and without requiring a separate agent key file. Further, additional manipulation on the management device 200 is unnecessary, even when the mapping relationship between the management device and the client group in the management server 100 changes.

Figure 4:
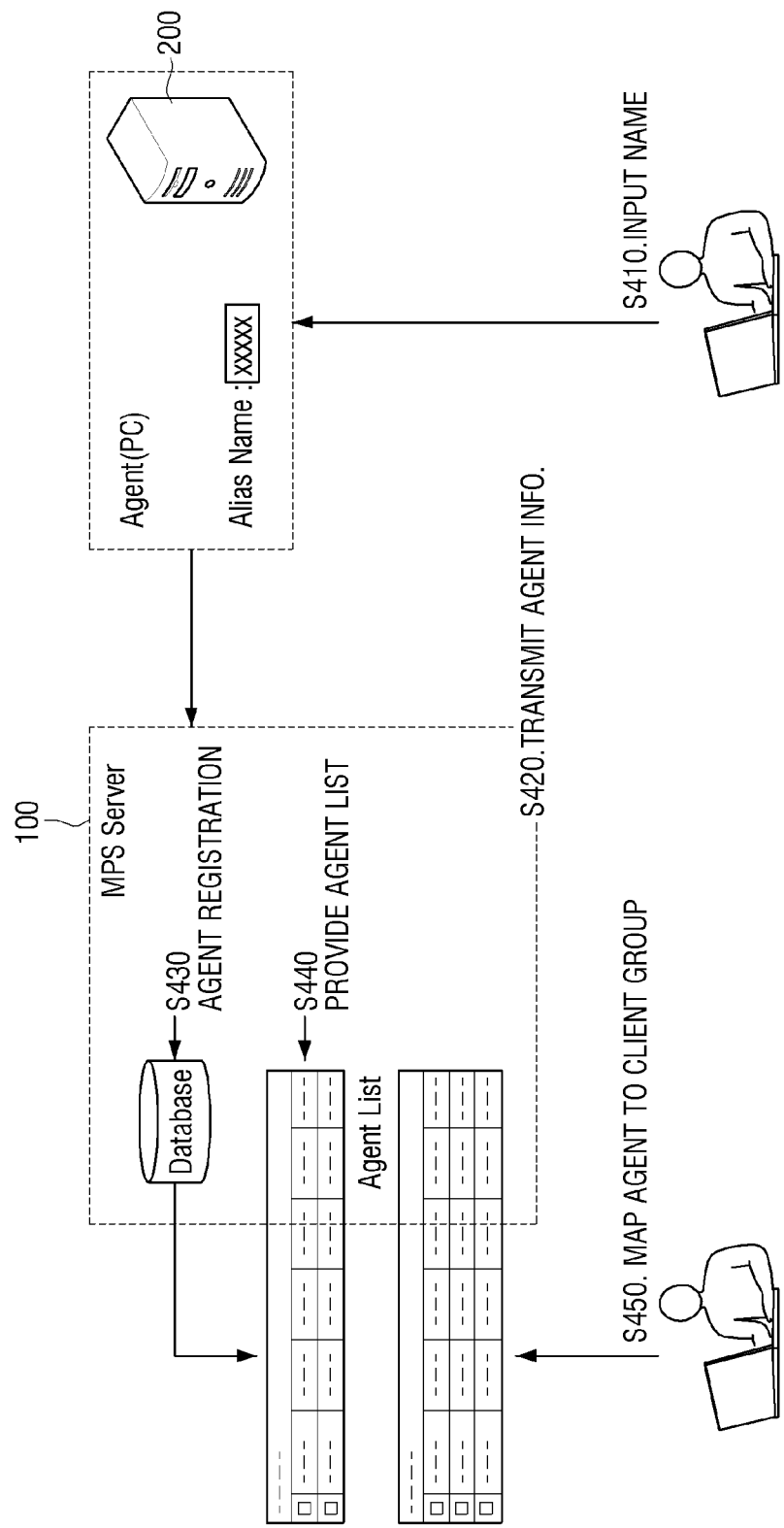
FIGS. 4 to 6 are views illustrating a method of mapping a management device and a client group according to exemplary embodiments of the present general inventive concept.
Figure 5:
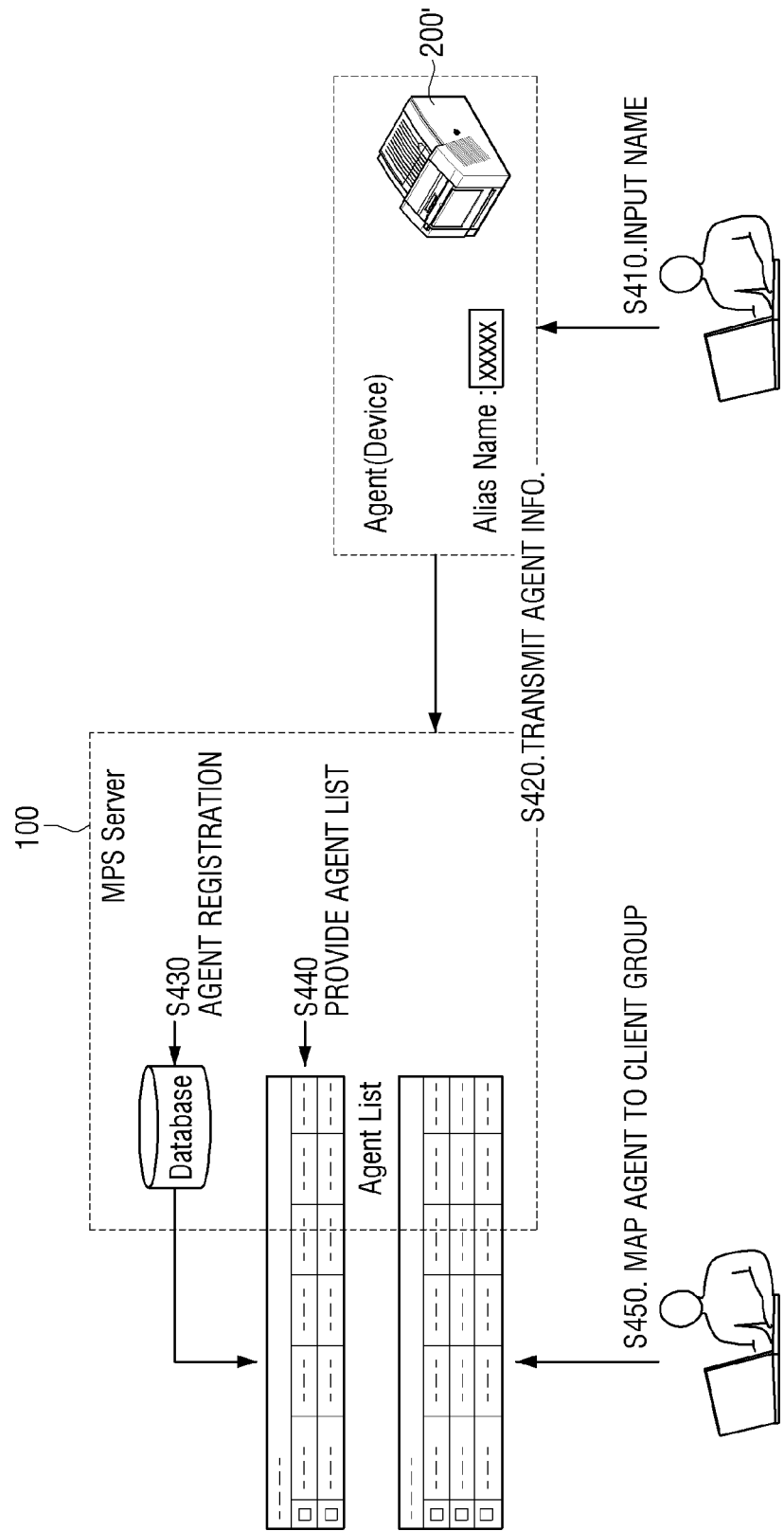
Figure 6:
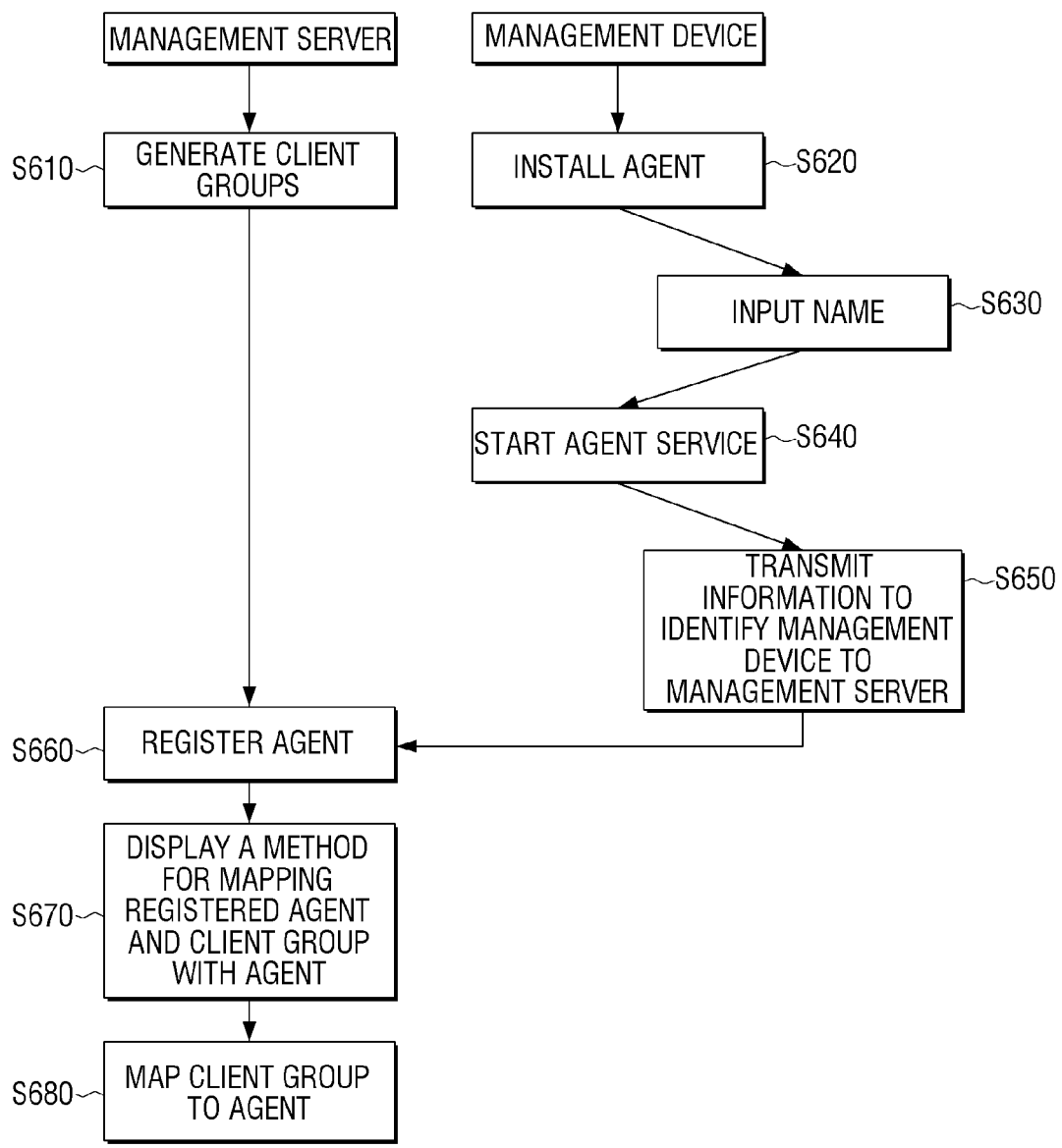

FIGS. 4 to 6 are views illustrating a method of mapping the management device with the client group according to exemplary embodiments of the present general inventive concept.

Referring to FIGS. 4 to 6, at operation S610, the manager can generate a plurality of client groups in the management server 100. At operation S620, the manager (or user) can install a program or a control module to operate as an agent on the management device 200, and at operations S410 and S630, the manager (or user) can set the name of the corresponding management device 200 in the installed program or control module so that the management device 200 can be an agent. At operation S640, the management device 200 can operate as an agent, and at operations S420 and S650, the management device 200 can transmit the management device identification information to the management server 100.

At operation S430 and S660, the management server 100 can store the information received from the management device 200 in a database. The database may be stored, for example, in the storage unit 140 of the management server 100, as illustrated in FIG. 2 and described in detail above. At operations S440 and S670, and the management server 100 indicates any non-mapped management device to the manager, so that at S450, S680, the manager can map the non-mapped management device with a specific client group.

As explained above, the method of mapping according to exemplary embodiments of the present general inventive concept includes mapping of the management device with the client group using the management device identification information transmitted from the management device, without having to separately generate an agent key file. The method of mapping according to the exemplary embodiments of the present general inventive concept can change the mapping relationship between the management device and the client group with the management server 100.

In the examples illustrated in FIGS. 1 to 4, a management device 200 may be a print control terminal apparatus (or a host device). In another non-limiting example, a management device may be an image forming apparatus, as illustrated in FIG. 5. A manager may set the name of an image forming apparatus 200'. As a result, the image forming apparatus 200' may be an agent, and may transmit its name to the management server 100 as identification information FIGS. 7 to 9 are views illustrating examples of the user interface window which can be displayed on the display unit 120 of the management server 100 of FIG. 2 according to exemplary embodiments of the present general inventive concept.

Referring to FIG. 7, the user interface window 700 displays a mapping relationship between the management device 200 and the client group. The user interface window 700 may include a first area 710 to display the management device mapped with a specific client group, and a second area 750 to display non-mapped management devices.

The first area 710 may display the client group currently selected by the manager from among the plurality of client groups under management of the management server, and the management devices mapped with the corresponding client groups. The first area 710 may include, among other things, the group name, the IP (internet protocol) address of the group, and the current status of the group. Status item 713 may illustrate the status of at least one job assigned to the group. As illustrated in FIG. 7, the job assigned to the group "UI Team" may be in an "activated" state.

The second area 750 is provided to display the non-mapped management devices from among the plurality of management devices connected to the management server 100. A first non-mapped management device 751 and a second non-mapped management device 752, as illustrated in FIG. 7, may include at least the serial number, the alias name, the IP address, and the type of device (e.g., personal computer (PC), server, image forming apparatus, etc.) of each of respective the non-mapped management devices 751 and 752.

The manager may identify the management device using the alias (or name) and IP address of the management device displayed on the second area 750, and map the identified management device with a specific client group. For example, as described above, the first non-mapped management device 751 and the second non-mapped management device 752 may each have serial numbers, as well as aliases "Solution LAB" and "Samsung," respectively. The operation of mapping the non-mapped management device with a specific client group will be explained in detail below with reference to FIG. 8.

The manager may select one of the management devices displayed on the second area 750 (e.g., the first non-mapped management device 751 and the second non-mapped management device 752), and in response to this, the display unit 120 may display a popup window 850 that may be separate from the user interface window 800 illustrated in FIG. 8.

FIG. 8 illustrates a user interface window that includes an area to display management devices mapped with a specific client group, and another area to display non-mapped management devices, as similarly illustrated in the user interface window 700 of FIG. 7 described above. The popup window 850 of FIG. 8 can display a plurality of client groups under management of the management server 100. The manager can select through the displayed popup window 850 a client group to which a corresponding management device is to be mapped (e.g., the selected device with the "Solution LAB" alias as illustrated in FIG. 8), and can map the corresponding management device with the specific client group. Arrow 860 illustrates that the mapped management device may be moved from the area of user interface window 800 displaying non-mapped management devices to the area displaying mapped management devices.

The manager may change the connection between the client group and the management device which have already been mapped. The operation of changing the connection between the client group and the management device which have already been mapped with each other will be explained below with reference to FIG. 9.

FIG. 9 illustrates a user interface window 900 that includes a first area 910 to display management devices mapped with a specific client group, and a second area 950 to display non-mapped management devices, as similarly illustrated in the user interface windows 700 and 800 of FIGS. 7-8 described above. Referring to FIG. 9, the manager can select an area 901 to delete the mapping relationship between the currently-displayed client group and management device. When this operation is complete, the management device that has been mapped with the displayed client group can be displayed on the second area 960. Arrow 960 illustrates that the mapped management device of the first area 910, when deleted by the selection of the area 910, is moved to the second area 950 that includes the non-mapped management devices. The manager may then select the client group to be mapped with the corresponding management device through the operation explained above with reference to FIG. 8, to thus re-set the mapping relationship.

Figure 10:
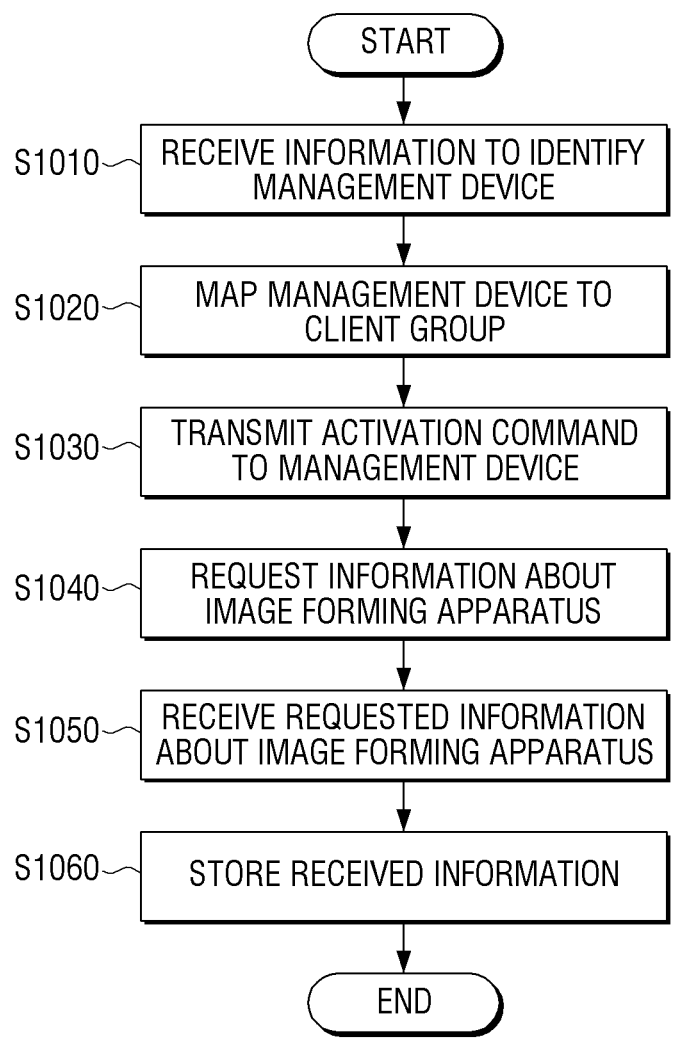
FIG. 10 is a flowchart illustrating a method of managing a plurality of image forming apparatuses at a management server according to exemplary embodiments of the present general inventive concept.

FIG. 10 is a flowchart illustrating a management method of the management server for a plurality of image forming apparatus according to exemplary embodiments of the present general inventive concept.

Referring to FIG. 10, at operation S1010, the management device identification information can be received from the management device (e.g., the management device 200 at remote distance) connected to at least one image forming apparatus. The information such as name (or alias), IP address, or unique serial number (e.g., MAC information) of the management device to identify the corresponding management device at the remote distance may be received.

At operation S1020, based on the received management device identification information, one of the plurality of client groups can be mapped to the management device. The mapping may be carried out automatically or manually as selected by the manager. The automatic mapping will be explained below. The management device identification information received from the management device with the previously stored management device identification information and/or information about the client group may be compared with each other, a client group to which the corresponding management device is to be mapped is selected, and the selected client group is mapped to the management device.

The manual mapping carried out in response to selection by the manager will now be explained. If the management device identification information is received from the management device 200, the presence of the non-mapped management device can be displayed to the manager, so that when the manager selects the client group to which the corresponding management device is to be mapped, the corresponding management device is mapped to the selected client group.

At operation S1030, an activation command, directing to collect the information about the image forming apparatus connected to the management device mapped with the client group, can be transmitted to the mapped management device. By doing so, the mapping between the management device and the client group is completed.

At operation S1040, the management device is requested to send out the information about the image forming apparatus connected thereto, and the requested information is received at operation S1050. The management device may be requested to send the information such as unique information (e.g., model name, IP address, driver information, location information, etc.) of the image forming apparatus, status information (e.g., on/off, generation of error, recording medium information (e.g., type, amount, etc., of recording medium) of the image forming apparatus, or job information (e.g., job log, operating ratio of the image forming apparatus connected thereto and as a result, the requested information may be received. That is, the management operation of a general MPS system (e.g., MPS management system 1000 illustrated in FIG. 1) on a plurality of image forming apparatuses is carried out.

At operation S1060, the received information about the image forming apparatus can be stored. The information about the image forming apparatus received from the management device 200 may be stored under each client group corresponding to the management device that sends out the information.

As explained above, the management method of the management server 100 according to exemplary embodiments of the present general inventive concept can map the management device 200 to the client group without having to separately generate an agent key file or install the generated agent key file on the management device 200 at remote distance. Further, the management method of the present general inventive concept can change the mapping relationship between the management device and the client group using only the control operation at the management server 100. The management method of FIG. 10 may be implemented on and/or performed by the management server 100 illustrated in FIG. 2, or on any other suitable management server to carry out the exemplary embodiments of the present general inventive concept disclosed herein.

Figure 11:
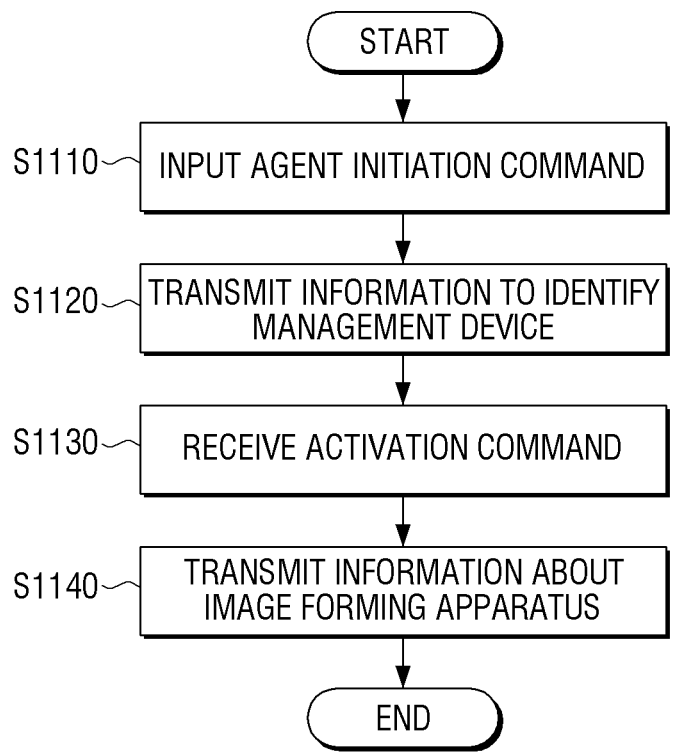
FIG. 11 is a flowchart illustrating a method of managing a plurality of image forming apparatuses at a management device according to exemplary embodiments of the present general inventive concept.
Figure 12:
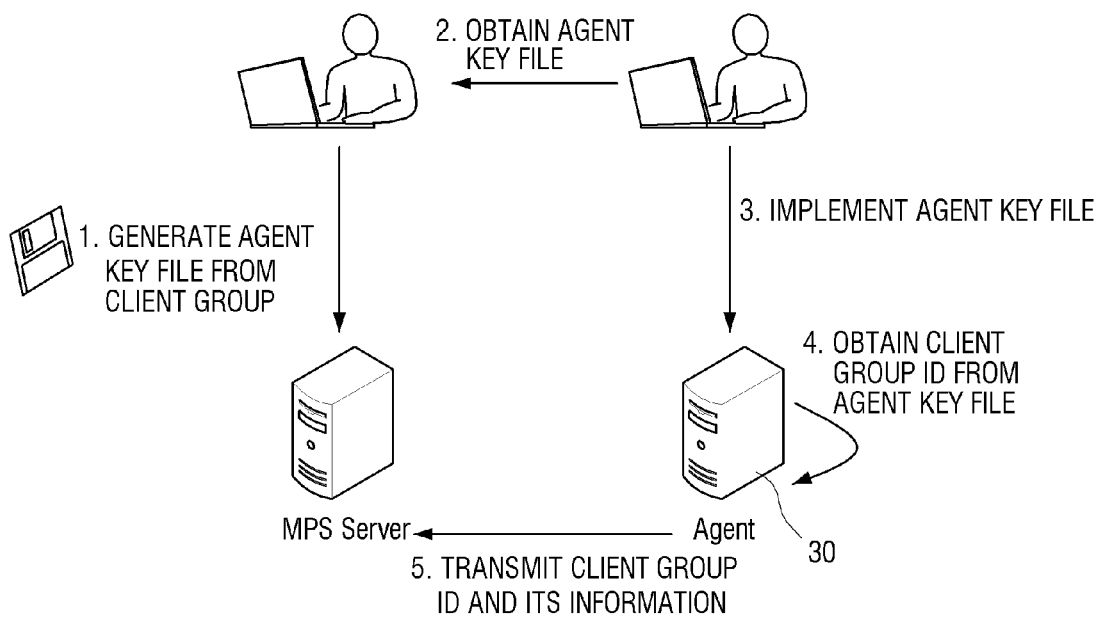
FIG. 12 illustrates a conventional method of mapping a management device with a client group.

FIG. 11 is a flowchart illustrating a management method of a management device for a plurality of image forming apparatuses according to exemplary embodiments of the present general inventive concept.

Referring to FIG. 11, at operation S1110, an agent initiation command is inputted, and information about the plurality of image forming apparatuses is provided to the management server. Along with the agent initiation command, the name of the corresponding management device may also be inputted by the manager (or user). If the name of the management device is inputted in advance, the above-mentioned operation may be omitted.

At operation S1120, if the agent initiation command is inputted, the management device identification information is transmitted to the management server. The name (or alias), IP address, or unique serial number (e.g., MAC information) of the management device may be transmitted to the management server 100 to thus identify the management device.

At operation S1130, an activation command can be received from the management server. At operation S1140, based on the activation command, the management device can operate as an agent, and can transmit the information of the image forming apparatuses connected to the management device to the management server.

Accordingly, the management method of the management device 200 according to exemplary embodiments of the present general inventive concept can map the management device with the client group through the operation of transmitting the identification information thereof to the management server 100 and without having to separately generating an agent key file. Further, even when the mapping relationship between the management device and the client group in the management server 100 changes, the management method according to exemplary embodiments of the present general inventive concept does not require any separate manipulation on the management device 200. The management method of FIG. 11 may be implemented on and/or performed by the management device as illustrated in FIG. 3, or any other suitable management device to carry out the exemplary embodiments of the present general inventive concept as disclosed herein.

The management methods illustrated in FIGS. 10 and 11 may be implemented as at least one execution program to execute the management method explained above, and such execution program may be stored on a computer-readable recording medium.

Accordingly, the respective blocks of the present general inventive concept may be implemented as computer-writable codes on the computer-readable recording medium. The computer-readable recording medium may be a device that can store the data readable by a computer system.

For example, the computer-readable recording medium may be ROMs, RAMs, CD-ROMs, magnetic tapes, floppy disks, optical disks, optical data storage devices or image display apparatuses such as televisions including storage devices. Further, the computer-readable codes may be implemented as a computer data subcarrier signal.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A management server, comprising:
   a storage unit to store information about a plurality of client groups;

a communication interface unit to receive management device identification information from at least one management device of a plurality of management devices at a remote distance;

a mapping device to map at least one client group from among the plurality of client groups with the at least one management device based on the received management device identification information; and a control unit configured to:
transmit an activation command, including an agent initiation command, to the at least one management device to initiate the at least one management device to act as an agent so that the at least one management device provides the management server with the management device identification information upon receipt of the agent initiation command, and direct the at least one management device, using the activation command, to collect information about image forming apparatuses corresponding to the at least one client group, wherein a mapping relationship between the at least one management device and the at least one client group is established through the management device identification information transmitted according to the activation command.

2. The management server of claim 1, wherein the management device identification information comprises at least one of a name, an internet protocol (IP) address, and a unique serial number of the at least one management device.

3. The management server of claim 1, further comprising:
a display unit to display non-mapped management devices of the plurality of management devices which are not mapped with the plurality of client groups; and an input unit to select at least one non-mapped management device from among the non-mapped management devices of the plurality of management devices and select a client group from among the plurality of client groups which is to be mapped with the selected management device, wherein the mapping device maps the selected management device with the selected client group.

4. The management server of claim 1, further comprising:
a management apparatus to request the at least one management device in receipt of the activation command for the information about the plurality of image forming apparatuses connected to the at least one management device in receipt of the activation command and receive the requested information.

5. The management server of claim 4, wherein the information about the plurality of image forming apparatuses comprises at least one of unique information, status information, and job information of each of the plurality of image forming apparatuses.

6. The management server of claim 5, wherein the job information comprises at least one of a number of copies to be printed, a job log, and an operating ratio of each of the plurality of image forming apparatuses.

7. The management server of claim 4, wherein the storage unit stores the received information about the plurality of image forming apparatuses under each corresponding client group.

8. A plurality of management devices connectable to a plurality of image forming apparatuses and a management server at a remote distance, a management device among the plurality of management devices comprising:
a user interface unit to receive an agent initiation command from the management server to request information about the plurality of image forming apparatuses from the plurality of image forming apparatuses;

a communication interface unit to transmit management device identification information to the management server from the management device, when the agent initiation command is received; and a control unit configured to:
control the communication interface unit to transmit the information about the image forming apparatuses connected to the management device to the management server, when the management device is newly mapped by the management server, and receive an activation command from the management server to initiate the management device to act as an agent so that the management device provides the management server with the management device identification information upon receipt of the activation command, wherein a mapping relationship between the management device and at least one client group from among a plurality of client groups is established through the management device identification information transmitted according to the activation command, and the information about image forming apparatuses connected to the management device is collected by the management device according to the activation command.

9. The management device of claim 8, wherein the user interface unit receives an input of a name of the management device, and the management device identification information comprises the inputted name of the management device.

10. The management device of claim 8, wherein the management device identification information comprises at least one of a name, an internet protocol (IP) address and unique serial number of the management device.

11. The management device of claim 8, wherein the management device is at least one of the image forming apparatuses, and a print control terminal apparatus connectable to the image forming apparatuses.

12. A method of managing a management server for a plurality of image forming apparatuses, the method comprising:
receiving management device identification information from at least one management device of a plurality of management devices at a remote distance;

mapping at least one client group from among a plurality of client groups with the at least one management device based on the received management device identification information;

transmitting an activation command, including an agent initiation command, to the at least one management device to initiate the at least one management device to act as an agent so that the at least one management device provides the management server with the management device identification information upon receipt of the agent initiation command, and directing the at least one management device, using the activation command, to collect information about image forming apparatuses corresponding to the at least one client group, wherein a mapping relationship between the at least one management device and the at least one client group is established through the management device identification information transmitted according to the activation command.

13. The method of claim 12, wherein the management device identification information comprises at least one of a name, an internet protocol (IP) address, and a unique serial number of the management device.

14. The method of claim 12, further comprising:
displaying non-mapped management devices of the plurality of management devices which are not mapped with the plurality of client groups; and
selecting at least one non-mapped management device from among the non-mapped management devices of the plurality of management devices; and
selecting a client group from among the plurality of client groups which is to be mapped with the selected management device,
wherein the mapping comprises mapping the selected management device with the selected client group.

15. The method of claim 12, further comprising:
when the activation command has been received, requesting the at least one management device for the information about the plurality of image forming apparatuses connected to the at least one management device in receipt of the activation command and receiving the requested information.

16. The method of claim 15, wherein the information about the plurality of image forming apparatuses comprises at least one of unique information, status information, and job information of each image forming apparatus of the plurality of image forming apparatuses connected to the at least one management device.

17. The method of claim 16, wherein the job information comprises at least one of a number of copies to be printed, a job log, and an operating ratio of each image forming apparatus of the plurality of image forming apparatuses connected to the at least one management device.

18. The method of claim 15, further comprising:
storing the received information about the plurality of image forming apparatuses connected to the at least one management device under each corresponding client group.

19. A method of managing a plurality of management devices for a respective plurality of image forming apparatuses, the method comprising:
inputting an agent initiation command to at least one management device of the plurality of management devices to provide information about the plurality of image forming apparatuses to a management server;
transmitting management device identification information from the at least one management device to the management server, according to the agent initiation command inputted to the at least one management device;
receiving an activation command from the management server to initiate the at least one management device to act as an agent to the management server upon receipt of the agent initiation command when the at least one management device is newly mapped by the management server; and
transmitting information about one or more of the respective plurality of image forming apparatuses to the management device to the management server, according to the activation command,
wherein a mapping relationship between the at least one management device and at least one client group is established through the management device identification information transmitted according to the activation command.

20. The method of claim 19, further comprising:
inputting a name of the at least one management device,
wherein the management device identification information comprises the inputted name of the at least one management device.

21. The method of claim 19, wherein the management device identification information comprises at least one of a name, an internet protocol (IP) address and unique serial number of the at least one management device.

22. The method of claim 19, wherein the at least one management device is at least one of the image forming apparatus, and a print control terminal apparatus connectable to the image forming apparatus.

* * * * *